July 4, 1961

S. FREEDMAN 2,991,411

METHOD AND APPARATUS FOR CONDUCTING
GEOPHYSICAL EXPLORATIONS

Filed Sept. 4, 1956

INVENTOR.
SAMUEL FREEDMAN

INVENTOR.
SAMUEL FREEDMAN

INVENTOR.
SAMUEL FREEDMAN

United States Patent Office 2,991,411
Patented July 4, 1961

2,991,411
METHOD AND APPARATUS FOR CONDUCTING GEOPHYSICAL EXPLORATIONS
Samuel Freedman, La Mesa, Calif., assignor to Geolectronics Inc., Enid, Okla., a corporation of Oklahoma
Filed Sept. 4, 1956, Ser. No. 607,814
14 Claims. (Cl. 324—5)

This invention relates generally to methods and apparatus for conducting geophysical and geological explorations into the structural features of the lithosphere and the hydrosphere by surveys at or close to the surface of the earth, and more particularly to a method and apparatus of this general character in which the tuning of grounded or ground-coupled antenna systems or circuits is utilized to produce signals indicative of the geophysical and geological properties of the earth at depths of interest therein.

The strength of these signals varies in accordance with the dielectric constant and/or conductivity of the various materials comprising the lithosphere and hydrosphere in the region of subsurface exploration, and the signals thus provide indications of the identity of materials therein. The materials, in turn, may provide direct indications of the presence of petroleum, for example, or of earth structures and formations such as reservoir rock which may comprise permeable sandstones, conglomerates and limestones favorable to the presence of oil. As is well known, oil and/or gas accumulate in the interstitial porespaces of the reservoir rock and is entrapped therein by impervious media above and below, along with suitable structural features that prevent lateral migration. Oil and rock are among the lowest of dielectric constant materials and have the poorest conductivities.

An object of this invention is to provide a new and improved method and apparatus for conducting geophysical and geological explorations into the lithosphere and the hydrosphere; to find conditions of homogeneity or nonhomogeneity of the materials therein; to find or pin point objects underground or under-water, or to determine their presence, and what materials lie between the same and the earth's surface; and to determine the conductivity and/or dielectric constant of such materials and objects.

Another object resides in the provision of an exploration method for the direct discovery of the accumulated presence of liquids or gases, including petroleum, in the interstitial pore-spaces of reservoir rock, porous and permeable sandstones, conglomerates and limestones.

Another object is to provide a new and improved exploration method and apparatus which provides a measure of the variations of the earth constants with depth and thus affords a direct means of locating petroleum and mineral deposits underground; locating lost mineral deposits and where they resume again; locating areas and depths favorable for water well drilling; locating submerged submarines regardless of depth by means other than Sonar; locating sunken ships or objects; locating buried piping and leaks therein; locating mines, caches and the like; detecting uranium or radioactive materials or ores particularly where the earth overlay prevents discovery by use of Geiger Mueller counters and the like in the absence of exposed outcroppings; locating sites favorable for best coverage for radio stations by virtue of choosing earth spots where immediate underlay has higher dielectric constant and higher conductivity; and evaluating earth conditions to determine whether favorable or unfavorable for earth removal or excavating projects.

Another object is to provide a method and apparatus for detecting earth conditions at depths of interest by changes of energy response of a ground-coupled radiating system whose behaviour is affected by the conditions of the earth.

Another object is to provide a comparative method and apparatus for detecting subsurface earth conditions wherein the behaviour of a ground-coupled radiating system is measured with the use above ground of an antenna composed of known materials other than conventional antenna structures and comprising materials approximating the anticipated earth materials in the subsurface regions under investigation.

The foregoing and additional objects are accomplished in accordance with the method and apparatus of the present invention by tuning a quarter wave Marconi antenna system or equivalent circuit to resonance. By antenna system, which has the same meaning as antenna circuit, is meant all of the elements which comprise the path in which the antenna current flows. For example, in the quarter wave grounded Marconi antenna, the system includes the antenna itself, the ground coupling and a path in the ground for a distance corresponding to the antenna above the ground (with its loading) divided by the square root of the dielectric constant of the ground material composition. The antenna system is tuned to resonance by a choice of three methods, namely:

(1) Varying the frequency of the oscillator for a given electrical length of the antenna system.
(2) Varying the electrical length of the antenna system for a given oscillator frequency.
(3) Varying the locale of the antenna system while maintaining a given electrical length of the antenna system and a given oscillator frequency.
(4) By various combinations of the above three resonating or detecting possibilities.

The conditions which have produced resonance are then altered in regular steps, either by changing the frequency, or the electrical length of the antenna system, or the locale. Any deviations which do not produce a uniform change in signal strength indicative of conditions of homogeneity are attributed to variations in the earth's dielectric constant and conductivity, and are taken as points of interest of subsurface material content.

When such points of interest are reached, the system may be retuned to optimum resonance and the change in either electrical length of the antenna system or the frequency of the oscillator is carefully noted.

Whenever feasible, the initial observation and resonance may be compared with that of an equivalent antenna system radiating in free space or made in a system where the earth's physical properties are known, and if need be, done in a shallow depth where this can be verified if not previously known. The signal response under such conditions will provide a reference which may be used for relative unity dielectric constant.

Thus, the condition of resonance at the aforementioned points of interest by comparison with the unity reference condition will provide an approximation of the dielectric constant of the material and a key or clue to its identity. The antenna system may also be constructed and arranged to include an antenna portion above the earth comparable to that anticipated below the surface and thus provide a means of effecting an apparent dipole resonant condition in which the wavelength above the ground approximates that below the ground and is shorter than in free space by an amount proportional to one over the square root of the dielectric constant of the material comprising the medium.

For a given type and quality of subsurface material, the energy penetrates deeper as the frequency is decreased or the wavelength is increased. It also does this as either or both the conductivity and the dielectric constant of the earth decreases. The greater the penetration of energy into the earth due to decrease in frequency, conductivity or dielectric constant, or any combination thereof, the less energy response will be detected at the surface detecting point. An evaluation of all foregoing factors mentioned herein will provide an approximation of the depth where the variations or conditions of non-homogeneity exist.

Other features, objects and advantages of the present invention are those implied or apparent from the following description of the best mode thus far devised for practicing the principles of the invention, reference being had to the accompanying drawings wherein.

Figure 1:
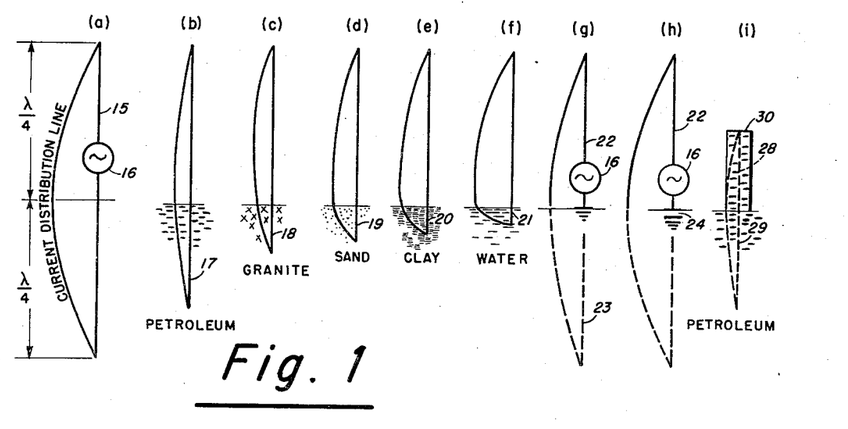
FIG. 1 shows the wavelength relationships for a given frequency between free space having unity dielectric constant and typical subsurface materials having higher dielectric constant.

Referring now ot the drawings for a more complete understanding of the invention and more particularly to FIG. 1(a) thereof, there is shown thereon a dipole antenna 15 for radiation into free space or air, the dielectric constant for air being taken as unity ($k=1$). Under the conditions shown, the dipole is resonated by the generator 16 whose frequency at resonance is related to the wavelength of the antenna as measured in terms of the wavelength of the radiated waves in accordance with the expression or equation $$\lambda = \frac{3 \times 10^8}{f\sqrt{k}}$$

where:

$\lambda$ = the wave length in meters
$f$ = the frequency in cycles per second
$k$ = the dielectric constant which is taken as unity for air The condition of resonance is depicted by the current distribution line from which it may be noted that the current in the dipole antenna is zero at the ends (nodes) and maximum at the generator (loop).

In FIG. 1(b), (c), (d), (e), (f) current distribution lines are comparatively illustrated, the generator being omitted for the sake of simplicity, for dipole antennas 17 to 21 in which the upper portion of each antenna is arranged for radiation in air and therefore has the same physical length as in FIG. 1(a), namely $$\frac{\lambda}{4}$$

Figures 2, 3:
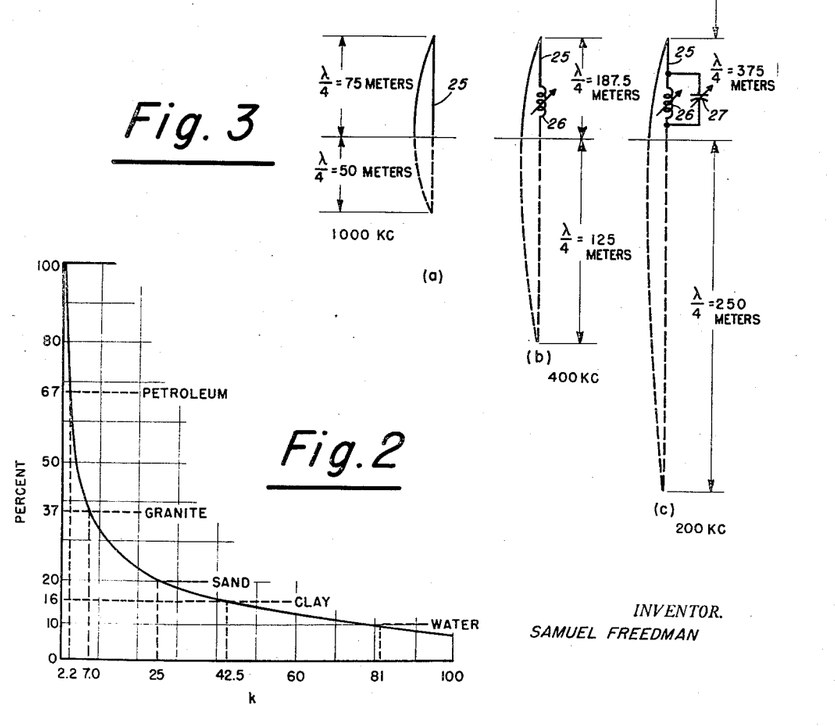
FIG. 2 is a graphic layout showing the percentual reduction of wavelength with respect to an antenna of infinite conductivity in free space for the same materials mentioned in FIG. 1.
FIG. 3 illustrates the technique employed for operating at reduced frequencies or longer wavelengths without excessive physical antenna height above the earth's surface.

The lower portions of these antennas, however, are arranged for radiation into different mediums having homogeneous earth materials such, for example, as petroleum (b), granite (c), sand (d), clay (e), and water (f). Thus, for example, in the case of damp sand which has a dielectric constant of about 25, the length of the antenna portion in the sand is about one-fifth that of the antenna portion in air, the antenna length varying inversely as the square root of the dielectric constant $k$ as may be noted from the aforementioned equation. FIG. 2 illustrates graphically the variation of antenna length with changes in dielectric constant where 100% represents $$\frac{\lambda}{4}$$

antenna length for free space wavelength.

In general, a material having a high dielectric constant also has a high conductivity and vice versa. For example, water with a dielectric constant of 81 has a conductivity in the order of $4.64 \times 10^{-11}$ electromagnetic units (E.M.U.) whereas sand with a dielectric constant of less than 25 may have a conductivity of $2 \times 10^{-14}$ E.M.U. For a given type and quality of subsurface material the energy penetrates deeper as the conductivity of the earth decreases. The higher the conductivity of the material, the greater will be the current level or density at the surface as depicted in FIG. 1 wherein it may be noted that the current density at the surface (surface line) for the examples of air-earth interface is the greatest for water, FIG. 1(f), in keeping with its high dielectric constant whereas the current density is much less at the surface in the case of petroleum, FIG. 1(b), which is characterized by a low dielectric constant and negligible conductivity.

In FIG. 1(a), the current density is high for the dipole, which is entirely in air, by virtue of the fact that both sections of the antenna are metallic with optimum conductivity. A grounded Marconi antenna, FIG. 1(g), can approach this current density only in the case of a perfect earth of infinite conductivity and dielectric constant. Thus, of the air-earth interface, examples illustrated in FIG. 1, 1(f), for water most nearly approaches the ideal earth case of FIG. 1(g).

In FIG. 1(g), as aforementioned, there is depicted a grounded quarter wave antenna 22 commonly known as a Marconi antenna in which the earth acts as the "other half" or lower portion 23 of the dipole and the current flows into the earth instead of into a discrete quarter-wave section similar to that above the earth. It will be understood that FIG. 1(g) merely illustrates academically what is obviously a hypothetical situation in which the antenna portions above and below the earth are shown to be of equal length. Under actual conditions as encountered in the practice of the present invention within the scope of the aforementioned objects, the actual length of the antenna portion below the surface will not be of the length illustrated in FIG. 1(g) but will be shorter by $$\frac{1}{\sqrt{k}}$$

where $k$ is the dielectric constant for whatever earth materials are situated below the antenna portion above the earth. The effective dielectric constan is based on whatever material or materials comprise the earth for a depth corresponding to free space wavelength divided by the square root of the effective dielectric constant which is the combined value of the several dielectric constants individual to the various materials in the case of non-homogeneity.

The physical length of the portion of the antenna system above the ground or its electrical length in the case of loading, and the electrical length of the effective portion of the antenna system below the earth's surface determine the operating frequency necessary for tuning the antenna system to resonance. The condition of resonance may be determined by measuring the rectified antenna current or the condition of maximum radiation from the antenna portion above the earth as will appear more fully in detail hereafter. The known length or height of this portion (electrical length for loaded antenna, physical length for no loading) then will provide a measure to a first approximation of the length of the antenna portion extending into the earth in accordance with the aforementioned equation.

$$\lambda e = \frac{3 \times 10^8}{f \sqrt{k_e}}$$

where for the grounded Marconi antenna:

$\lambda e$ = the length of the antenna portion below the earth in meters $k_e$ = the effective dielectric constant of the earth to the depth $\lambda e$ $f$ is the resonating frequency as before This therefore gives some measure of the depth of exploration. As before mentioned, current in the antenna system flows into the earth and to varying depths depending upon the variations from perfect earth conditions. As the current flows into the lower antenna portion comprising the earth to a depth corresponding to the length of the antenna portion above the earth divided by the square root of the effective dielectric constant, the current is attenuated rapidly with extreme depth but does not disappear regardless of how infinitesimally small it may become. Enough remains to affect resonance at the surface for great depths.

In accordance with prior art methods of determining earth constants by the wave tilt method, it has been found that attenuation occurs at a rate determined by the earth's constants and the frequency. The depth of penetration of the current increases with decreasing frequency, decreasing effective dielectric constant of the earth, and decreasing earth's conductivity. The rate at which the current is attenuated with depth may be expressed by the equation:

$$\frac{\text{Current density at depth } d}{\text{Current density at surface}} = \epsilon^{-\rho d}$$

where:

$\epsilon$ is the naperian base = 2.73

$$\rho = \left[ \frac{XB}{2} \left( \sqrt{1 + \frac{(\sigma \times 10^9)^2}{B^2}} - 1 \right) \right]^{1/2}$$

$d$ = depth in centimeters
$X = 0.008 \pi^2$ fmc.
$B = 0.556 \times 10^{-6}$ kfmc.
$k$ = dielectric constant of the earth
fmc. = frequency in megacycles
$\sigma$ = earth conductivity in E.M.U.

The current penetrates to a considerable depth. Thus with $k=5$, $f=1$ megacycle and $\sigma = 2.8 \times 10^{-14}$ E.M.U., the depth at which the current is approximately in the order of one-fourth its value at the earth's surface is approximately 14 meters for an antenna length of $$\frac{\lambda}{4} = 75 \text{ meters}$$

above ground and 25 meters below ground. As an approximation, this checks satisfactorily with the relative lengths shown in FIGS. 1 and 2.

A grounded antena as in FIG. 1(g) is only one form of suitable ground coupling of the antenna to the earth. This is considered the best coupling where earth surface conditions permit ease of penetration of a grounding rod below the weathered or top soil zone, the ground rod being extended preferably to give a suitable ground connection, and, if feasible, to depths less subject to influence of appreciable high surface conductivity should this condition exist. In the case where a high degree of mobility is desired and in cases where earth conditions make establishing an antenna ground connection inconvenient, time consuming or physically impracticable, as in the case of a rock surface, the bottom of the vehicle or metallic extension thereof to the earth's surface, or other form of vehicle ground contact microscopically separated from or loosely contacting the earth's surface becomes the equivalent of capacitance in series with the earth and the antenna on the vehicle. Thus, this provides capacitance coupling as illustrated schematically in FIG. 1(h) wherein 24 designates the effective capacitor.

Leaving now the theoretical aspects of the invention and moving to the more practical aspects, it will be readily understood that it would be impractical to physically increase the length of the antenna as the frequency is reduced to study and evaluate responses for greater depths of interest. Accordingly, antenna loading techniques are employed to produce apparent increases in length of the antenna portion above the earth.

The effect of coil loading on antenna length is illustrated in FIG. 3. FIG. 3(a) illustrates a frequency of 1000 kilocycles without loading of the antenna 25 and necessitates an antenna length or height of 75 meters in order to penetrate 50 meters into a homogeneous earth condition having a dielectric constant of 2.25 (petroleum). Placing an inductance in series with antenna 25 can reduce this antenna height to a more convenient shortened length. FIG. 3(b) shows a frequency of 400 kilocycles or 2½ times longer wavelength without changing the actual antenna height of that illustrated in FIG. 3(a) for 1000 kilocycles. This is accomplished by the addition of the adjustable loading coil 26 in series with the antena 25 in FIG. 3(b). FIG. 3(c) for a frequency of 200 kilocycles or half the frequencsy of FIG. 3(b) permits the same physical antenna height as for FIG. 3(a) and 3(b) and optionally the same amount of loading coil as FIG. 3(b) by addition of an adjustable shunting condenser 27 for the loading coil 26 to decrease the effective frequency or correspondingly increase the wavelength at resonance. Thus, any physical antenna height of convenience may be employed for any frequency of depth of interest (wavelength) through judicious choices or adjustment of inductance and capacitance in series or in parallel including decade arrangements thereof.

FIG. 1(i) shows a practical arrangement for avoiding need for antennas of great physical length in order to achieve sub-earth antenna lengths corresponding to great depths. This is accomplished by providing an apparent antenna portion 28 above the earth which is the equivalent of that apparent antenna portion 29 expected to be encountered below the earth. Thus, as may be seen graphically in FIG. 1, the antenna portion 28 above the earth for petroleum in keeping with its higher dielectric constant is shorter than a metallic antenna would be in free space.

FIG. 1(i) is also a standard of reference for matching unknown conditions underground with known values of materials constituting the antenna portion above ground to thereby aid in discovery and evaluation. The antenna portion above ground may be encased in a metallic housing 30 to prevent external radiation and ground reflections and wave tilt effects which might introduce spurious or unwanted earth effects that may affect tuning and may undesirably add or subtract from the normal or true signal indications desired in accordance with the method of the present invention.

Where exploration is to be conducted under conditions other than horizontal earth's surface, for example, vertical or some intermediate angle between vertical and horizontal, the antenna is disposed perpendicularly to such surface, with the functioning still remaining the same or very similar to that thus far described. The antenna system is polarized in a plane opposite to the plane of the earth's surface, to emphasize functioning into the earth rather than along the surface of the earth.

Figure 4:
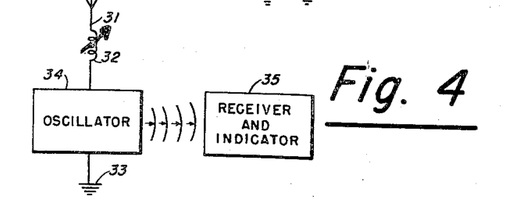
FIG. 4 illustrates diagrammatically the simplest form of apparatus suitable for practicing the invention.
Figures 5, 6:
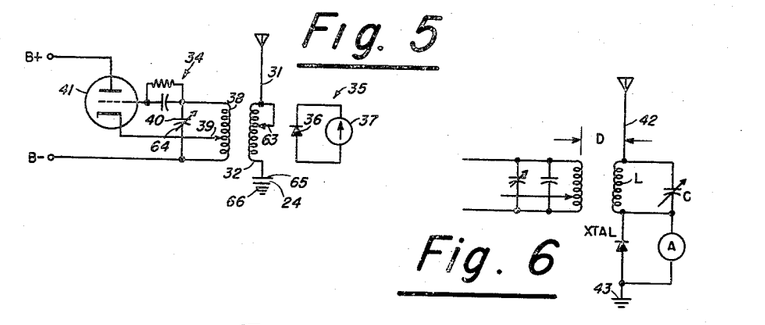
FIG. 5 illustrates an electronic system employing inductive coupling between the antenna circuit and oscillator and space coupling between the antenna and detecting circuits.
FIG. 6 illustrates an oscillator excited transmitter tunable over a wide frequency range and having selective inductive coupling distance and employing rectification of the antenna current for direct detection of signal strength.

FIG. 4 illustrates diagrammatically the simplest form of apparatus suitable for practicing the exploration method of the present invention, wherein, the antenna system comprises an antenna 31 of convenient length, an adjustable loading element 32, connected to the ground 33 and suitably energized with a source 34 of radio frequency energy connected inductively or capacitively to that antenna system. The condition of resonance and off-resonance is detected by a suitable receiver and indicator 35. FIG. 5 illustrates a receiver and indicator 35 which comprises a crystal rectifier 36 and meter 37 space coupled to the antenna system. FIG. 5 also illustrates a method of inductive coupling of the antenna system to the oscillator 34 in which the antenna loading coil 32 is the secondary of a transformer having a primary winding 38 forming the oscillator tank circuit. The frequency of the oscillator can be controlled by adjustment of the tank coil tap 39 and the parallel condenser 40. The tube 41 and the elements associated therewith constitute any well known form of radio frequency oscillator circuit.

FIG. 6 comprises an oscillator excited transmitter which is tunable over a wide frequency range and located a selective inductive coupling distance (D) from an antenna system with comparable frequency range to provide resonance of the antenna system. The antenna system comprises a Marconi antenna 42 of convenient physical length such as 40 feet or less with inductance L in series to make up for inadequate antenna length, which in the combination illustrated requires a ground connection 43. Current is registered in microamperes on a meter or recorder (A) connected across the crystal rectifier (XTAL).

The wavelength within a limited band is scanned by an adjustable capacitor C which shunts a choice of interchangeable band coils L which in an actual working circuit had the following frequency ranges:

Band 1 from 10 to 21 kilocycles
Band 2 from 20 to 44 kilocycles
Band 3 from 42 to 104 kilocycles
Band 4 from 100 to 230 kilocycles
Band 5 from 225 to 570 kilocycles In this specific setup, the antenna is a 4-section, 40 feet long when fully extended, raised and lowered by compressed air. Actual contact with the ground is made at each observing point by driving a ground rod securely into the earth.

Figure 7:
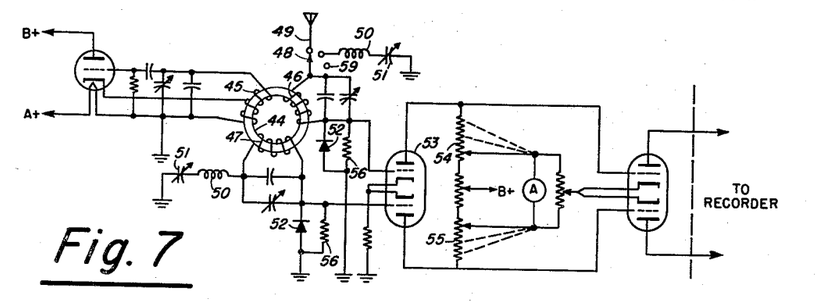
FIG. 7 shows a complete electronic system similar to FIG. 6 but with additional features and structural details.

FIG. 7 shows a complete electrical system generally similar to that of FIG. 6 with additional features and structural details such as the use of a toroidal core 44 upon which is wound the oscillator tank coil section 45, the antenna inductance coil 46 and a bridge coil 47. Each coil is matched for inductance and other characteristics. In a specific circuit arrangement, ten such wound toroids are employed to cover the frequency bands as follows:

Band 1—1.00 to 1.20 kilocycles
Band 2—1.20 to 1.50 kilocycles
Band 3—1.50 to 2.00 kilocycles
Band 4—2.00 to 3.00 kilocycles
Band 5—3.00 to 6.00 kilocycles
Band 6—6.00 to 7.50 kilocycles
Band 7—7.50 to 10.00 kilocycles
Band 8—10.00 to 15.00 kilocycles
Band 9—15.00 to 30.00 kilocycles
Band 10—30.00 to 120.00 kilocycles The use of the toroidal coils provide higher Q and consequently sharper tuning at resonance and stronger signal responses. It also prevents ambient and stray magnetic fields from affecting the operation of the circuit and thereby minimizes spurious indications.

As shown in this figure, a switch 48 is employed to transfer the inductance 46 of the antenna system from connection to the antenna 49 to connection with a grounded and series connected inductance 50 and capacitance 51. With the latter connection to the antenna system, i.e., without the antenna, the antenna system is then identical with the circuit including the bridge coil 47. Thus, signal output at the rectifier 52 of each, connected to the grid inputs of the dual triode tube 53 produce equal voltages in the two plate loads 54 and 55 of the amplifying tube. The microammeter (A) connected at equal resistance points on either side of B+ plus power supply under the foregoing conditions produces a zero center reading of the microammeter, the bridge being balanced.

When the switch 48 is moved to connect the antenna 49 and disconnect the series capacitance 51 and inductance 50, the triode section connected to the rectifier output of the antenna system now produces a voltage output which is a measure of the current in the radiating antenna system whose behaviour is affected by conditions in the ground to depths of interest. Under these conditions, the meter will now take a plus or minus reading in accordance with relative strengths of the signal inputs into the amplifier. The imbalance as indicated on the microammeter will give a comparative measure of the subsurface condition relative to the bridge reference which will automatically change in value in accordance with a change in oscillator frequency. The changes resulting from change in oscillator frequency will affect both coils in like manner, thereby maintaining constant bridge reference.

Each crystal rectifier 52, when directly connected as illustrated, is protected by a low resistance shunt 56 which may also serve as an A.C. bypass.

Figure 8:
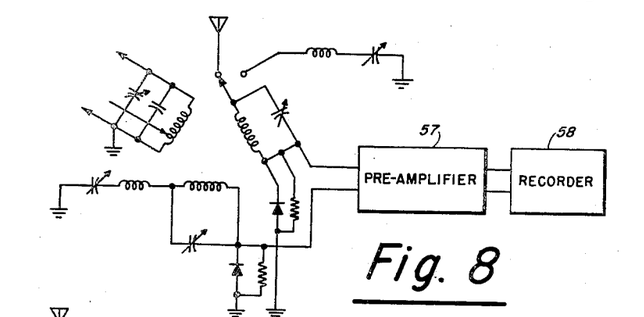
FIG. 8 shows the same system for use with a preamplifier and a recorder in the detecting portion.

The system may use either a microammeter shown as (A) or continue through a preamplifier 57 and recorder 58 as shown in FIG. 8. Various sensitivities for the ammeter or the recorder are available by judicious selection of resistance portions of the plate loads.

In a simplified version of FIG. 7, an off-center meter or recorder is employed to eliminate the need for the bridge circuit and the third coil 47 of the toroid, and the lower section of triode amplifier 53 connected thereto. In this case, with the switch 48 disconnected from antenna 49 and connected to ground through series connected inductance 50 and capacitor 51, the amplifier bias (not shown) is adjusted to move the meter to the center of the scale. Thus, when switch 48 is moved to contact the antenna 49, the meter A reads a value more or less than the center value, depending on the relative signal strength of the antenna system and the circuit including the series connected inductance and capacitance. In this arrangement with each change in frequency, or change of coils, it is necessary to adjust meter to its center position on the scale whereas, in the use of the bridge circuit, this is automatically accomplished as aforedescribed.

Under some conditions, it may be desirable to compare the antenna system with and without the antenna, in which event the series connected inductance 50 and capacitance 51 will not be needed. The effect of the antenna at the lower frequencies, where it contributes inappreciably to the antenna system electrical length, may permit the switch 48 to be moved to the open position in contact with switch element 59 in which event operations may be conducted without an antenna.

Figure 9:
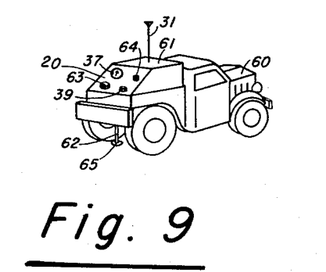
FIG. 9 illustrates a mobile installation suitable for practicing the method of the invention.

FIG. 9 illustrates a mobile installation suitable for practicing the method of the present invention in which a jeep or other suitable vehicle 60 carries the main unit comprising the aforedescribed electrical equipment in which the antenna 31 is suitably mounted on the equipment unit 61 and may, if desired, be telescopically changed in length in a well known manner such as by use of compressed air. The ground rod 62 may be driven in and out by a motor arrangement without the need for a person to leave the vehicle. The antenna loading coil 32 is included in the equipment unit and is adjustable by knob or other control 63. Other controls on the equipment unit comprise the adjustment 39 of oscillator tank coil, adjustment 64 for tank capacitor 40, and meter (37) mounted for observation. In the more elaborate installations, the meter is replaced or augmented by a recording device such as an Esterline Angus Millivolt or equivalent unit. Provisions may also be provided for aural reception with a pair of earphones in the crystal rectifier circuit. The oscillator may employ either continuous wave (C.W.) or modulated wave transmission (M.C.W.).

In the mobile arrangement depicted in FIGS. 5 and 9, capacitive ground coupling of the antenna system is accomplished by use of suitable means (not shown) for lowering a metallic point or plate 65 electrically connected to the extension 62 leading to and electrically connected to the loading coil 32. Member 65 in contact or adjacent to the ground or otherwise microscopically spaced therefrom forms a condenser 24 with the earth. The antenna system then comprises the antenna 31, the loading coil 32, the condenser 24, and the earth designated 66 all in series and in this illustration would be vertically polarized.

Figure 10:
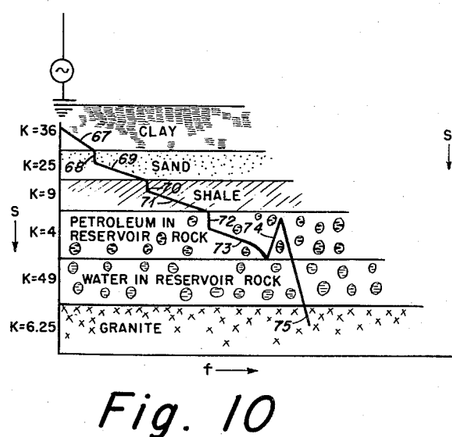
FIG. 10 illustrates relative changes in detected energy or signal strength when the subsurface antenna portion penetrates homogeneous stratifications under the earth's surface in descending orders of dielectric constant and conductivity until water in reservoir rock is reached with high dielectric constant and conductivity followed by granite or basal rock of low dielectric constant at the limiting depth of interest.

Assuming now that the aforedescribed equipment has been set in operation and tuned to resonance above a ground condition such as depicted in FIG. 10 in which the earth to a certain depth therein comprises successive homogeneous layers of clay, sand, shale, petroleum in reservoir rock, water in reservoir rock, and finally granite or basalt rock and in which the maximum signal indicated by meter (37) corresponds to a depth of the earth antenna portion extending into the clay layer. Then, as the frequency is decreased as indicated by the direction of the arrow, the signal strength decreases and the depth of the earth antenna portion increases uniformly with decline in signal strength as indicated by the curve portion 67 of curve showing relationship between signal strength and frequency, until the sand layer is reached in which case the signal strength drops abruptly or nonuniformly as indicated at 68 based on the poor conductivity and lower dielectric constant of sand with respect to clay above it, providing greater current penetration into the earth.

Thereafter, with further decrease in frequency, the signal strength declines uniformly in the homogeneous sand layer in curve portion 69 until the shale layer is reached at which time signal strength again drops abruptly as at 70 followed by gradual decline again as at 71 until the petroleum in reservoir rock layer is reached. Again, we have an abrupt drop 72 in signal strength followed by uniform decline 73 with decrease in frequency. Assuming, as is possibly the case, the petroleum rock layer lies above a water in reservoir rock layer having a combined dielectric constant of 49 and a high conductivity, the extreme opposite of petroleum rock having a combined dielectric constant of 4 and minimum conductivity, there would develop a sharp increase in signal strength as indicated by 74. Further decrease in frequency is accompanied by a final decline in signal strength as indicated by 75 as the granite or basalt rock is reached and ends all interest.

Figure 11:
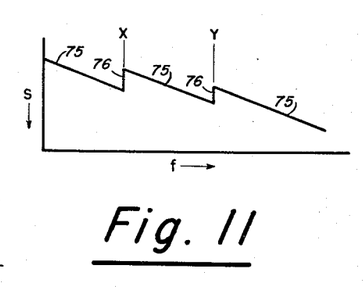
FIG. 11 illustrates graphically the change in signal strength with decline in frequency for a homogeneous earth and with recurrent returning to resonance.

FIG. 11 illustrates graphically the uniform decline 75 in signal strength with a decline in frequency for a homogeneous earth condition, and with recurrent retuning to resonance as indicated at points X and Y which lifts signal strength as indicated at 76.

Figure 12:
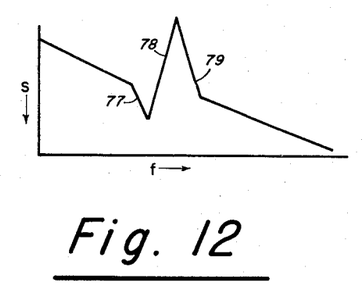
FIG. 12 illustrates how the signal strength variation illustrated in FIGS. 10 and 11 are utilized for an unknown situation that is presumably oil and water trapped in reservoir rock at great underground depth.

FIG. 12 illustrates how the signal strength variations illustrated in FIGS. 10 and 11 are utilized for an unknown situation such as, for example, oil trapped in reservoir rock lying above water trapped in reservoir rock, where oil-rock has minimum dielectric constant and conductivity, while water-rock has maximum. It may be noted that initial signal strength is maximum at maximum frequency which may be assumed to be the resonating frequency. Thus, as frequency is reduced, the signal strength falls off uniformly until it falls off abruptly as at 77 because of encountering a much lower dielectric constant such as petroleum-rock. Declining the frequency still further, it produces a sharp increase as 78 in the signal strength due to subjacent layer of water-rock, after which further decreases in frequency produce a uniform decline in signal strength as 79. Because the sharp decrease and sharp rise are of interest, the antenna system is tuned to resonance to restudy the situation with maximum signal strength, to better form conclusions as to the depth at which this phenomena occurs in terms of the resonating frequency.

Figure 13:
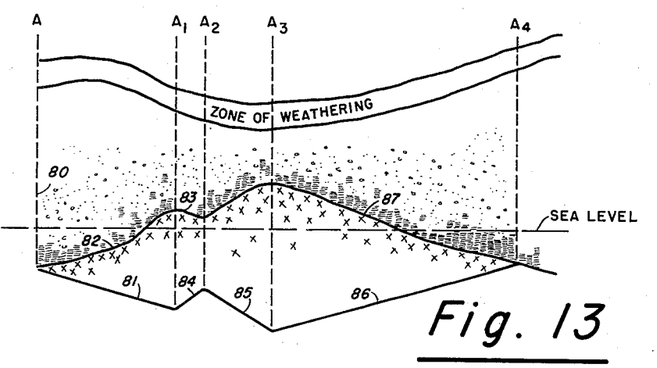
FIG. 13 illustrates a subsurface earth condition of considerable variation in stratigraphy including subterranean earth faults.

FIG. 13 shows considerable variation in the subsurface stratifications of earth from point to point over an area to be surveyed. For example, assuming that an antenna resonance condition has been established at point (A) indicative of lower antenna portion 80 penetration to granite strata. Without changing oscillator frequency or antenna system electrical length, the apparatus is now moved toward point ($A_1$) which will tend to reduce signal strength uniformly as indicated at 81 with the upward slope 82 of the granite strata until the point of fault 83 or folding at $A_1$ is reached. Then, there is a tendency for signal increase at 84 due to downward slope at fault 83 of the lower dielectric constant granite with respect to its overlay of clay until ($A_2$) is reached. Then the signal declines again as at 85 until the apex of the granite strata is reached at $A_3$. Thereafter the signal strength gradually increases as at 86 in accordance with the downward slope 87 of the granite until the resonant condition is again obtained at $A_4$.

In detecting or evaluating signal fluctuations due to changes in dielectric constant and conductivity, allowance is always made for the decline in signal strength due to lengthening of the wavelength and decrease in frequency as penetration depths are increased. The latter is relatively uniform and constant decline with depth, whereas signal changes for different materials depend on dielectric constant and conductivity in each material or blend of materials.

It will be understood that the operator of the equipment has the option of adjusting either to resonating frequency or adjusting the length of the antenna system to provide resonance, or may use a combination of both and do either for either the same or diverse locations.

It will be understood that, under actual conditions, the lithosphere, to within present penetrable depths, definitely is composed of non-homogeneous materials. In an oscillating RF circuit employing a grounded inductance antenna, the ground (lithosphere and/or hydrosphere) acts as a capacitance variable in accordance with the chemical and physical characteristics and dimensions of the media under observation. Hypothetically, the non-homogeneity of the section, with its diverse accumulation of various dielectric constants for each successive fortion of the said medium, accounts for a dielectric factor proportional to the sum of the dielectric constants when considering the whole of any given vertical section of the lithosphere or hydrosphere.

It should be further understood with respect to the term "rock" as it appears herein that "rock" is a very general term and is never used as a concrete definition for any specific petrologic material. The word "petroleum" is derived from the Greek root, Petros, meaning rock, hence petroleum or "rock oil." The expression "oil in reservoir rock" therefore is used in this specification to designate a specific petrologic material. Another specific material of this type is sand dampened due to oil content. This combination sharply reduces the dielectric constant and conductivity with respect to sand itself, whereas sand dampened with water has the extreme opposite characteristics.

The subject of petrographic nomenclature is complex and involved and it suffices therefore to give only a brief discussion herein. Petrography can be grouped into three major classifications, namely:

(a) *Igneous.*—Igneous are those basal rocks that theoretically were formed by the cooling of the mundane sphere following its nebulous origin, or those rocks formed by the effects of vulcanism; such as, granites, basalts, etc.

(b) *Metamorphic.*—Metamorphic are those rocks which have been altered or changed by heat, time, pressures and the action of liquids and gases; for example, marble is the metamorphosed equivalent of limestone with schists and gneiss as examples of metamorphic derivation from the igneous, etc.

(c) *Sedimentary.*—Sedimentary are those rocks decomposed or eroded from igneous and/or metamorphic rocks and usually deposited in layers or laminations along the continental shelves, lakes and stream beds; such as sands, sandstones, clays, shales, conglomerates, as well as the limes and limestones which are the calcareous secretions of sea organisms, etc. Such sediments can also be wind blown deposits as well.

From the foregoing it should now be apparent that methods and apparatus have been devised which are well adapted to accomplish and fulfill the aforestated objects of the invention. While certain examples and applications of the invention have been disclosed for practicing the principles thereof, still other modifications and applications of the apparatus and method of the present invention will become apparent to those skilled in the art to which this invention most closely appertains without departing from the spirit and scope of the invention as defined by the appended claims.

What is claimed is:

1. A method of conducting explorations into the lithosphere and hydrosphere from the surface of the earth comprising the steps of generating antenna current in a ground-coupled antenna system and directing said current into the earth, tuning said system relative to resonance for a known earth condition below the surface of the earth at the point of ground-coupling thereto, said system including a vertical antenna portion extending above the ground and an antenna earth portion extending into the earth below said vertical antenna portion a distance equal to $$\frac{1}{\sqrt{k}}$$

times the electrical length of said antenna portion above the ground where $k$ is the dielectric constant proportional to the sum of the dielectric constants of the various earth materials encountered along the antenna earth portion, changing the position of ground-coupling of said system over the surface of the earth, and measuring variations in said antenna current at each position thereby to detect variations of homogeneity of the earth materials.

2. A method of conducting exploration into the lithosphere and hydrosphere from the surface of the earth comprising the steps of ground coupling a tunable source of electrical oscillations with an antenna system, said system including a vertical antenna portion extending above the ground and an antenna earth portion extending into the earth below said vertical antenna portion a distance equal to $$\frac{1}{\sqrt{k}}$$

times the electrical length of said antenna portion above the ground where $k$ is the dielectric constant proportional to the sum of the dielectric constants of the various earth materials encountered along the antenna earth portion, tuning said source to the resonant frequency of the ground-coupled system, measuring the strength of the electrical oscillations flowing into the ground, indicating the condition of resonance by the maximum strength of said oscillations as measured at the earth's surface, detuning said source by decreasing the frequency of the oscillations in discrete steps, indicating a homogeneous earth condition by uniform decreases in the strength of said measured oscillations with decreases in frequency, and indicating non-homogeneous earth conditions by irregular changes in said measured strength with decreases in frequency.

3. The method as in claim 2 and including the additional step of tuning the ground-coupled system to resonance at the frequencies indicative of non-homogeneous earth conditions.

4. A method of conducting explorations into the lithosphere and hydrosphere from the surface of the earth comprising the steps of coupling a quarter wave vertical antenna to the earth, generating current in said antenna and directing said current into the earth, adjusting the electrical length of said antenna in discrete steps indicative of successive depths of penetration of antenna current into the earth, tuning the antenna to resonance with the antenna length at each of said steps, and following each step of tuning to resonance progressively decreasing the frequency of the antenna current and concurrently measuring the current until the current level at the surface detecting point has dropped to a value too low to be measured for that step.

5. A method of measuring distances into the earth at any angle thereinto comprising the steps of ground-coupling a quarter wave antenna at the surface of the earth, orienting said antenna perpendicular to the plane surface of the earth, generating current in said antenna and directing said current into the earth, and tuning the antenna to resonance whereby an unknown distance into the earth is measured by the antenna current flowing thereinto along a path coaxial with said antenna and to a distance approximating $$\frac{1}{\sqrt{k}}$$

times the electrical length of the antenna, where $k$ is the effective dielectric constant of the earth materials disposed along the current path at the angle of interest.

6. A comparative method of measuring the dielectric constant and conductivity of an unknown earth material to a depth of interest therein comprising the steps of directing the current of known frequency into the earth at a point having said unknown material therein and simultaneously directing said current into a column of ground coupled material of known dielectric constant and known conductivity, shielding said column of ground coupled material to prevent radiation of electrical energy therefrom, and measuring the condition of resonance and non-resonance of said current to indicate the similarity and non-similarity of the materials above and below the surface of the earth.

7. The method of claim 6 including the additional step of measuring the antenna current at the earth's surface to indicate the condition of resonance by the maximum value of the measured current.

8. A system for conducting geophysical explorations into the lithosphere and hydrosphere of the earth by surveys on the surface of the earth comprising, the combination of, a preselected one of a plurality of toroidal cored coils, each having wound and equi-spaced thereon a group of three coils, said plurality of toroidal cored coils differing from each other by their resonant frequencies and each covering a discrete band of frequencies, a tunable oscillator including a first one of said group of three coils and a first variable condenser connected thereacross for tuning the oscillator over the frequency band of said preselected toroidal cored coil, a bridge circuit comprising a second one of said group of three coils, a second variable condenser connecting one end of said second coil to ground, a resistor connecting the other end of said second coil to ground, a third variable condenser connected across said second coil, a rectifier connected across said resistor, a fourth variable condenser connected on one side thereof to ground, an antenna, a ground coupling circuit for said antenna comprising the third of said group of three coils, switch means for connecting one side of said third coil to said antenna and alternatively to the other side of said fourth variable condenser, a fifth variable condenser connected across said third coil, a resistor connecting the other side of the third coil to ground, a rectifier connected across said last named resistor, a dual section amplifier tube having one grid connected to the junction of said second coil and said resistor connected thereto and a second grid connected to the junction of said third coil and said resistor connected thereto, a potentiometer having a centrally disposed wiper arm and two additional wiper arms disposed respectively between the ends of the potentiometer and said centrally disposed wiper arm, said tube having the plates thereof connected respectively to the ends of said potentiometer, a source of electrical energy connected to said centrally disposed wiper arms and to the cathodes of said amplifier tube, and meter means connected to said additional wiper arms.

9. Apparatus of the character disclosed for conducting geophysical and geological explorations into the lithosphere and hydrosphere by surveys over the earth's surface comprising, in combination, transport means movable over the earth's surface, a quarter wave antenna carried on said transport means, means for adjusting the physical length of said antenna, means connected electrically to said antenna for adjusting the electrical length thereof, means operable from said transport means for capacitively coupling said antenna to the earth, means electrically connected to said antenna for generating oscillatory currents therein and in the earth path coupled thereto, means for adjusting the frequency of said oscillatory currents, means for rectifying said oscillatory currents, and means for indicating the strength of said rectified currents.

10. Apparatus for making comparative measurements of known and unknown earth materials comprising a quantity of said known material having known dielectric constant and conductivity, means electrically coupling said quantity of known material to the earth, means electrically connected to said quantity of known material for generating electrical oscillations therein and in an earth path coupled thereto, shield means encasing said quantity of known material for preventing radiation of said electrical oscillations therefrom, and means for measuring and indicating the strength of said electrical oscillations.

11. A system for conducting geophysical explorations into the lithosphere and hydrosphere of the earth by surveys on the surface of the earth comprising, the combination of three spaced coils, a tunable oscillator including a first one of said group of three coils and a first variable condenser connected thereacross for tuning the oscillator over the frequency band of said coil, a bridge circuit comprising a second one of said group of three coils, a second variable condenser connecting one end of said second coil to ground, a resistor connecting the other end of said second coil to ground, a third variable condenser connected across said second coil, a rectifier connected across said resistor, a fourth variable condenser connected on one side thereof to ground, an antenna, a ground coupling circuit for said antenna comprising third of said group of three coils, switch means for connecting one side of said third coil to said antenna and alternatively to the other side of said fourth variable condenser, a fifth variable condenser connected across said third coil, a resistor connecting to the other side of the third coil to ground, a rectifier connected across said last named resistor, a dual section amplifier tube having one grid connected to the junction of said second coil and said resistor connected thereto and a second grid connected to the junction of said third coil and said resistor connected thereto, a potentiometer having a centrally disposed wiper arm and two additional wiper arms disposed respectively between the ends of the potentiometer and said centrally disposed wiper arm, said tube having the plates thereof connected respectively to the ends of said potentiometer, a source of electrical energy connected to said centrally disposed wiper arms and to the cathodes of said amplifier tube, and meter means connected to said additional wiper arms.

12. A system for conducting geophysical explorations into the lithosphere and hydrosphere of the earth by surveys on the surface of the earth comprising, the combination of, a preselected one of a plurality of three spaced coils, each plurality differing by their resonant frequencies and each covering a discrete band of frequencies, a tunable oscillator including the first one of said group of three coils and a first variable condenser connected thereacross for tuning the oscillator over the frequency band of said preselected coil, a bridge circuit comprising a second one of said group of three coils, a second variable condenser connecting one end of said second coil to ground, a resistor connecting the other end of said second coil to ground, a third variable condenser connected across said second coil, a rectifier connected across said resistor, a fourth variable condenser connected on one side thereof to ground, an antenna, a ground coupling circuit for said antenna comprising the third of said group of three coils, switch means for connecting one side of said third coil to said antenna and alternatively to the other side of said fourth variable condenser, a fifth variable condenser connected across said third coil, a resistor connecting the other side of the third coil to ground, a rectifier connected across said last name resistor across of which is connected a current indicating meter.

13. A system for conducting geophysical explorations into the lithosphere and hydrosphere of the earth by surveys on the surface of the earth comprising, the combination of, a plurality of two spaced coils, said plurality differing from each other by their resonant frequencies and each covering a discrete band of frequencies, a tunable oscillator connected across the first of these two coils, an antenna connected to one end of the second coil, a tuning variable condenser across the second coil, a ground capacitively coupled to other end of second coil, a rectifier between antenna and ground shunted by a current indicating meter.

14. Apparatus of the character disclosed for conducting geophysical and geological explorations into the lithosphere and hydrosphere by surveys over the earth's surface comprising, in combination, a quarter wave antenna, means for adjusting the physical length of said antenna, means connected electrically to said antenna for adjusting the electrical length thereof, means for coupling said antenna to the earth, means electrically connected to said antenna for generating oscillatory currents therein and in the earth path coupled thereto, means for adjusting the frequency of said oscillatory currents, means for rectifying said oscillatory currents, and means for indicating the strength of said rectified currents.

References Cited in the file of this patent

UNITED STATES PATENTS

| | | |
|---|---|---|
| 1,864,024 | Lowy | June 21, 1932 |
| 1,960,027 | Ricker | May 22, 1934 |
| 2,172,688 | Barret | Sept. 12, 1939 |
| 2,242,312 | Machts | May 20, 1941 |